(12) United States Patent
Zangi et al.

(10) Patent No.: US 8,199,840 B2
(45) Date of Patent: Jun. 12, 2012

(54) MULTIPLE-INPUT, MULTIPLE-OUTPUT COMMUNICATION SYSTEM WITH REDUCED FEEDBACK

(75) Inventors: Kambiz C. Zangi, Chapel Hill, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1447 days.

(21) Appl. No.: 11/740,417

(22) Filed: Apr. 26, 2007

(65) Prior Publication Data

US 2012/0114060 A1  May 10, 2012

(51) Int. Cl.
*H04B 7/02* (2006.01)
(52) U.S. Cl. ........ 375/267; 375/260; 375/299; 375/340; 375/347; 455/101; 455/132; 455/296; 370/334
(58) Field of Classification Search .......... 375/260, 375/267, 299, 340, 347; 455/101, 132, 296; 370/334
See application file for complete search history.

(56) References Cited

U.S. PATENT DOCUMENTS

| | | | |
|---|---|---|---|
| 6,380,910 B1 | 4/2002 | Moustakas et al. | |
| 7,675,988 B2* | 3/2010 | Kim et al. | 375/267 |
| 2004/0147227 A1* | 7/2004 | Hamalainen et al. | 455/69 |
| 2006/0286974 A1* | 12/2006 | Gore et al. | 455/422.1 |
| 2007/0071147 A1 | 3/2007 | Sampath et al. | |

FOREIGN PATENT DOCUMENTS

| | | |
|---|---|---|
| WO | 02095982 A1 | 11/2002 |
| WO | 2006138555 A2 | 12/2006 |
| WO | 2006138581 A2 | 12/2006 |

OTHER PUBLICATIONS

K.C. Zangi and L.G. Krasny, "Capacity-Achieving Transmitter and Receiver Pairs for MISO Channels," *IEEE Transaction on Wireless Communications*, vol. 2, No. 6, Nov. 2003, pp. 1204-1216.
Thomas Salzer and David Mottier, "On Spatial Covariance Matrices for Downlink Eigen-Beamforming in Multi-Carrier CDMA," *Proc. IEEE Int. Conf. on Acoustics, Speech and Signal Processing (ICASSP)*, 2005, pp. 1133-1136.
R.W. Heath Jr. and A. Paulraj, "Multiple antenna arrays for transmitter diversity and space-time coding," *Proc. IEEE Int. Conf. on Communications (ICC'99)*, vol. 1, Jun. 1999, pp. 36-40.
Li Ping, Linrang Zhang, and So, H.C. "On a hybrid beamforming/space-time coding scheme," *IEEE Communications Letters*, vol. 8, Issue 1, Jan. 2004, pp. 15-17.

* cited by examiner

*Primary Examiner* — Leon Flores
(74) *Attorney, Agent, or Firm* — Coats & Bennett, P.L.L.C.

(57) ABSTRACT

In MIMO systems, two or more transmit signals are transmitted from different antenna clusters having one or more transmit antennas each. A precoding circuit weight the transmit signals transmitted from each transmit antenna using a common set of frequency independent antenna weights for all antenna clusters. The antenna weights are computed based on correlations between transmit antennas in the same antenna cluster.

20 Claims, 9 Drawing Sheets

US 8,199,840 B2

MULTIPLE-INPUT, MULTIPLE-OUTPUT COMMUNICATION SYSTEM WITH REDUCED FEEDBACK

BACKGROUND

The present invention relates to multiple-input, multiple output (MIMO) communication systems, and more particularly, to a MIMO system that uses knowledge of the statistics of the communication channel to prefilter the transmit signal(s).

In recent years, there has been much interest in multiple input, multiple output (MIMO) systems for enhancing data rates in mobile communication systems. MIMO systems employ multiple antennas at the transmitter and receiver to transmit and receive information. The receiver can exploit the spatial dimensions of the signal at the receiver to achieve higher spectral efficiency and higher data rates without increasing bandwidth.

The best performance in a MIMO system is obtained when the channel response is known to the transmitter. In this case, the transmitter can use knowledge of the channel response to compute antenna weights for each antenna so as to compensate for the channel conditions between the transmitter and the receiver. The amount of channel feedback from the receiver in such systems increases with the number of antennas at the transmitter and the receiver. The channel feedback from the receiver to the transmitter consumes valuable reverse link resources. Therefore, it is desirable to reduce the amount of feedback required to be sent on the reverse link while maintaining good performance on the forward link.

SUMMARY

The present invention relates to a MIMO system that reduces the amount of channel feedback required to prefilter the transmit signals while maintaining good performance. The transmit antennas at the transmitter are grouped into clusters. There is a one-to-one correspondence between antenna clusters at the transmitter and receive antennas at the receiver. A different transmit signal is transmitted by each antenna cluster. Each transmit antenna in a given antenna cluster transmits a weighted version of the same transmit signal. A common set of frequency independent antenna weights are used for all antenna clusters. Thus, the antenna weights for the first transmit antenna in the first cluster is the same as the antenna weights for the first transmit antenna in the second, third fourth, etc, antenna cluster. By using the same set of antenna weights for all antenna clusters, the amount of channel feedback required to prefilter the transit signal is significantly reduced.

DETAILED DESCRIPTION

Figure 1:
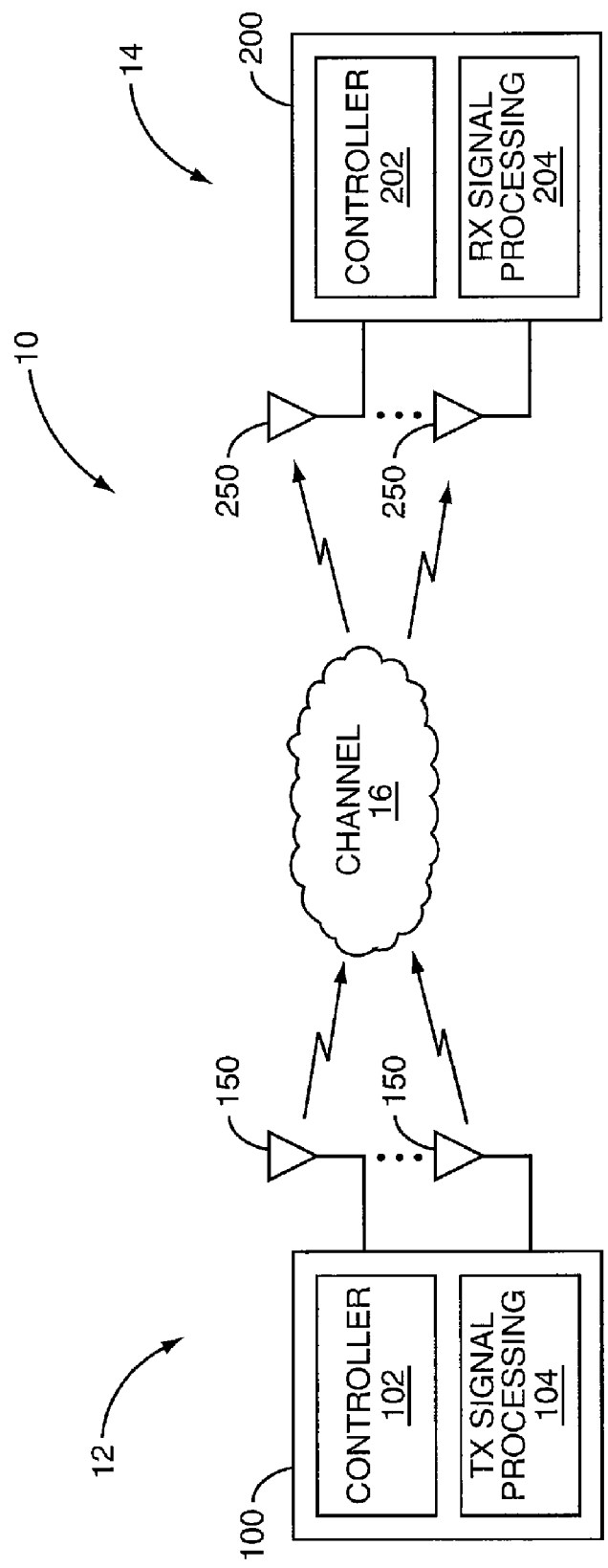
FIG. 1 illustrates a multiple input, multiple output (MIMO) communication system.

FIG. 1 illustrates a multiple input/multiple output (MIMO) wireless communication system 10 including a first station 12 and a second station 14. The first station 12 includes a transmitter 100 for transmitting signals to the second station 14 over a communication channel 16, while the second station includes a receiver 200 for receiving signals transmitted by the first station 12. Those skilled in the art will appreciate that the first station 12 and second station 14 may each include both a transmitter 100 and receiver 200 for bi-directional communications. In one exemplary embodiment, the first station 12 is a base station in a wireless communication network, and the second station 14 is mobile station. The present invention is particularly useful in Orthogonal Frequency Division Multiplexing (OFDM) systems.

An information signal I(n) in the form of a binary data stream is input to the transmitter 100 at the first station 12. The transmitter includes a controller 102 to control the overall operation of the transmitter 100 and a transmit signal processing circuit 104. The transmit signal processing circuit 104 performs error coding, maps the input bits to complex modulation symbols, and generates transmit signals for each transmit antenna 150. After upward frequency conversion, filtering, and amplification, transmitter 100 transmits the transmit signals from respective transmit antennas 150 through the communication channel 16 to the second station 14.

The receiver 200 at the second station 14 demodulates and decodes the signals received at each antenna 250. Receiver 200 includes a controller 202 to control operation of the receiver 200 and a receive signal processing circuit 204. The receive signal processing circuit 204 demodulates and decodes the signal transmitted from the first station 12. The output signal from the receiver 200 comprises an estimate $\hat{I}(n)$ of the original information signal. In the absence of errors, the estimate $\hat{I}(n)$ will be the same as the original information signal input I(n) at the transmitter 100.

Because multiple data streams are transmitted in parallel from different antennas 150, there is a linear increase in throughput with every pair of antennas 150, 250 added to the system without an increase in the bandwidth requirement. MIMO systems have been the subject of extensive research activity worldwide for use in wireless communication networks because of their potential to achieve high spectral efficiencies, and therefore high data rates.

A MIMO system with M transmit antennas and N receive antennas is typically described by the following matrix representation:

$$y(f)=G(f)x(f)+z(f), \qquad \text{Eq. (1)}$$

where y(f) is the N×1 received signal vector, G(f) is the N×M MIMO channel response, z(f) is the independent and identically distributed (i.i.d.) AWGN at the receiver with individual variance of 2, and x(f) is the M×1 transmitted signal vector with a certain power constraint. In general, the best performance in a MIMO system is achieved when the channel response is known to the transmitter 100 so that the transmit signals can be weighted accordingly by the transmitter 100 prior to transmission.

One MIMO approach that is attracting significant attention is Per Antenna Rate Control (PARC). In PARC systems, information to be transmitted is divided into multiple streams. Each stream is independently encoded and modulated, and then transmitted from a respective transmit antenna 150. The coding rates depend on the signal to interference plus noise ratio (SINR). In conventional PARC systems, the number of transmit antennas 150 is fixed and all transmit antennas 150 are used all the time to transmit data to mobile stations.

Another MIMO approach attracting attention is known as the Eigen Beamforming (EBF). In EBF systems, the transmit signals transmitted by each transmit antenna 150 are pre-filtered prior to transmission. For MIMO systems using Eigen Beamforming (EBF), a precoding circuit applies an M×N coding matrix and outputs N transmit signals; one for each receive antenna 250. The rows of the precoding matrix are the N eigen vectors, corresponding to the largest eigen values of the matrix:

$$\overline{H} = \frac{1}{N_f} \sum_{k=1}^{N_f} G^H(f_k) G(f_k),$$ Eq. (2)

where $N_f$ is the number of averaging sub-carriers. In the EBF approach, M×N complex elements of the precoding matrix must be fed back from the receiver 200 to the transmitter 100 on the reverse link. For purposes of this application, the term reverse link is used to refer to the channel used to feedback information from the receiver to the transmitter. The reverse link channel may be an uplink channel (mobile terminal to base station) or a downlink channel (base station to mobile terminal).

Figure 3:
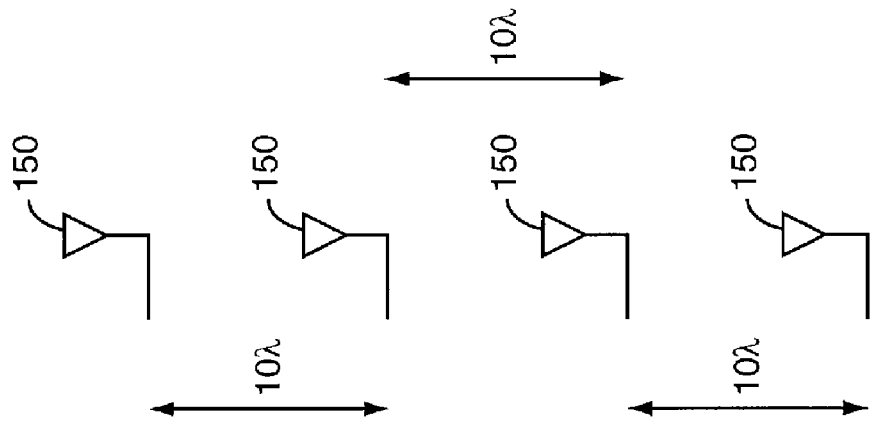
FIG. 3 illustrates a distributed antenna geometry for a transmitter in a MIMO system.
Figure 2:
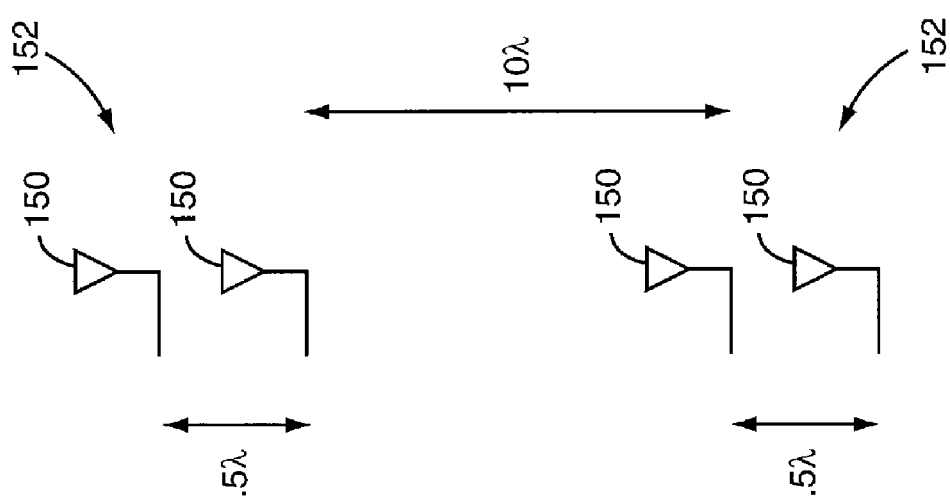
FIG. 2 illustrates a clustered antenna geometry for a transmitter in a MIMO system.

Different antenna geometries can be used with either the PARC approach or the EBF approach. FIGS. 2 and 3 illustrate two exemplary antenna geometries for a MIMO transmitter 100. The antenna geometry shown in FIG. 2, referred to herein as the clustered geometry, groups the transmit antennas 150 into two or more antenna clusters 152. The antenna clusters 152 are separated by a large distance (e.g., 10λ) so that the antennas 150 in different antenna clusters 152 can be considered to be essentially independent from each other. The transmit antennas 150 within each antenna cluster 152 are closely spaced (e.g., 0.5λ) so that the transmit antennas 150 within the same antenna cluster 152 are highly correlated. The geometry shown in FIG. 3, referred to as the distributed geometry, places the transmit antennas 150 far apart (e.g., 10λ) so that all of the transmit antennas 150 can be considered mutually independent.

Figure 5:
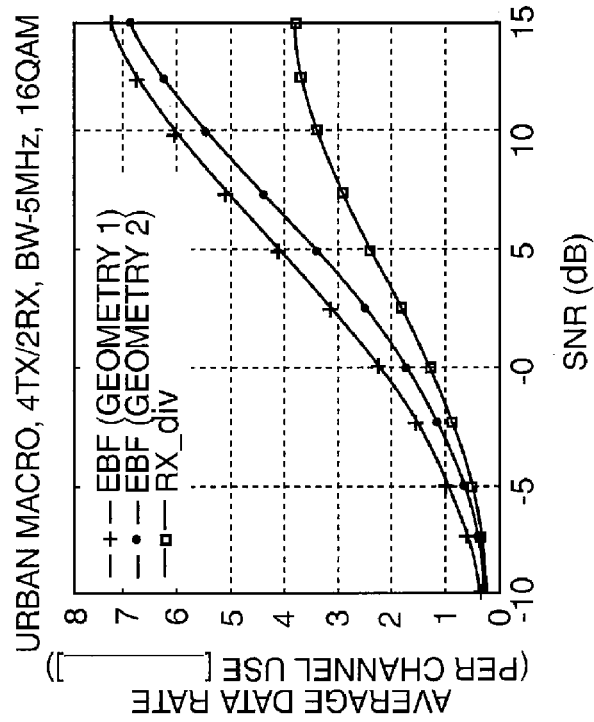
FIG. 5 is a graph illustrating the relative performance of MIMO transmitters using PARC and EBF with a distributed geometry.
Figure 4:
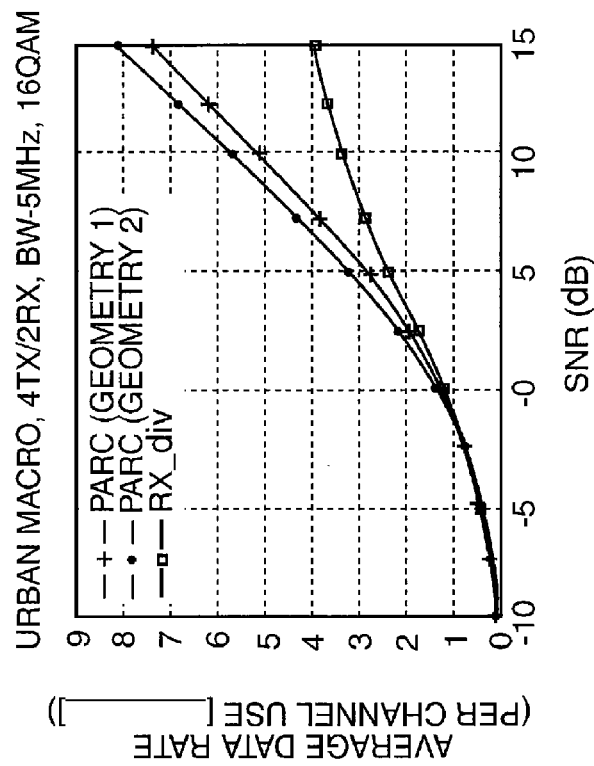
FIG. 4 is a graph illustrating the relative performance of MIMO transmitters using Per Antenna Rate Control (PARC) and Eigen Beamforming (EBF) respectively with a clustered geometry.

FIGS. 4 and 5 illustrate the relative performance of the PARC and EBF approaches for the clustered and the distributed antenna geometries. FIG. 4 shows the average data rate as a function of the average SNR for the PARC approach. FIG. 4 shows that the PARC approach is best when the distributed geometry (Geometry 2) is used. FIG. 5 shows the average data rate as a function of the average SNR for the EBF approach. FIG. 5 shows that the EBF approach is best when the clustered geometry (Geometry 1) is used.

Figure 6:
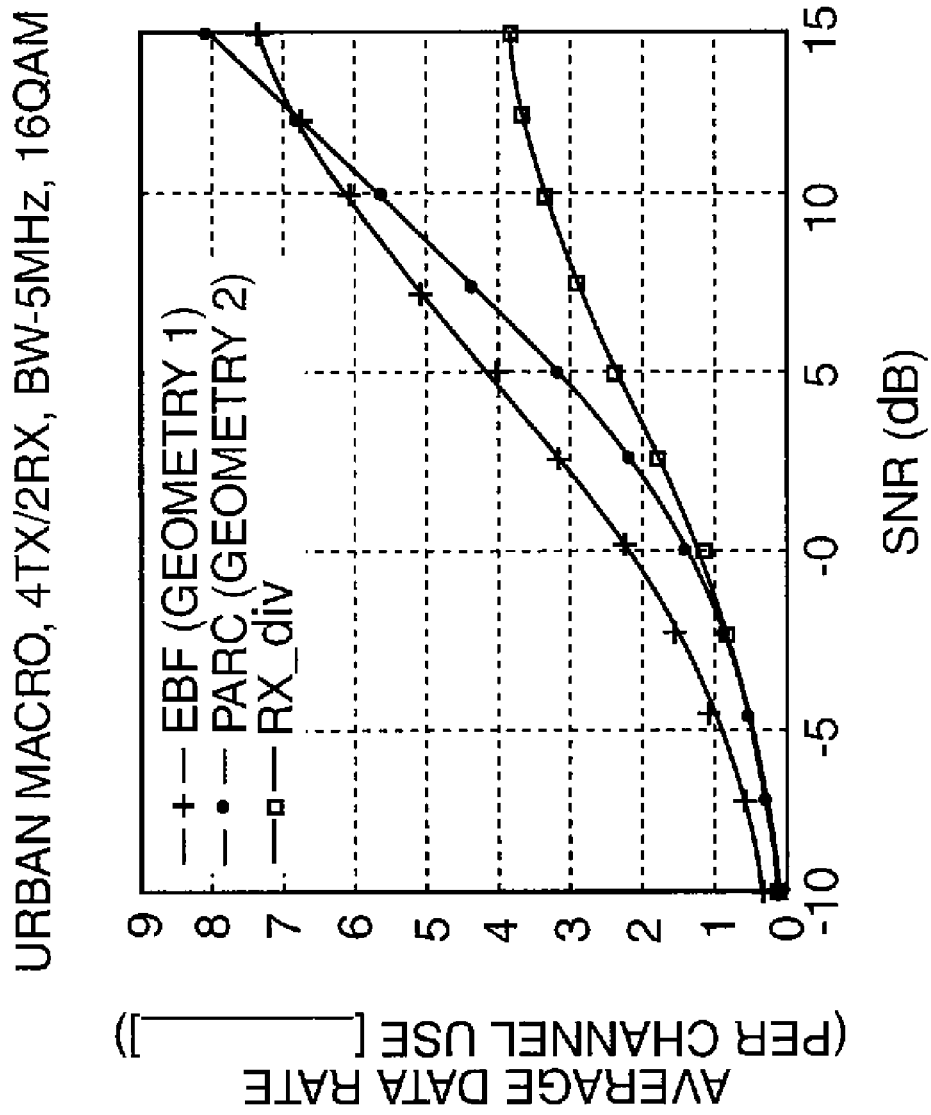
FIG. 6 is a graph illustrating the relative performance of MIMO transmitters using respectively EBF with a clustered geometry and PARC with a distributed geometry.

FIG. 6 compares the performance of the PARC approach using a distributed geometry with the EBF approach using the clustered geometry. FIG. 6 shows that the EBF approach with the clustered geometry is best when the SNR is below 12 dB. In a typical mobile communication system with a 1/1 reuse factor, the overwhelming majority of users (e.g. approximately 90%) will have an SNR less than 12 dB. Thus, the EBF approach with a clustered geometry will be the best approach for the majority of users.

Figure 7:
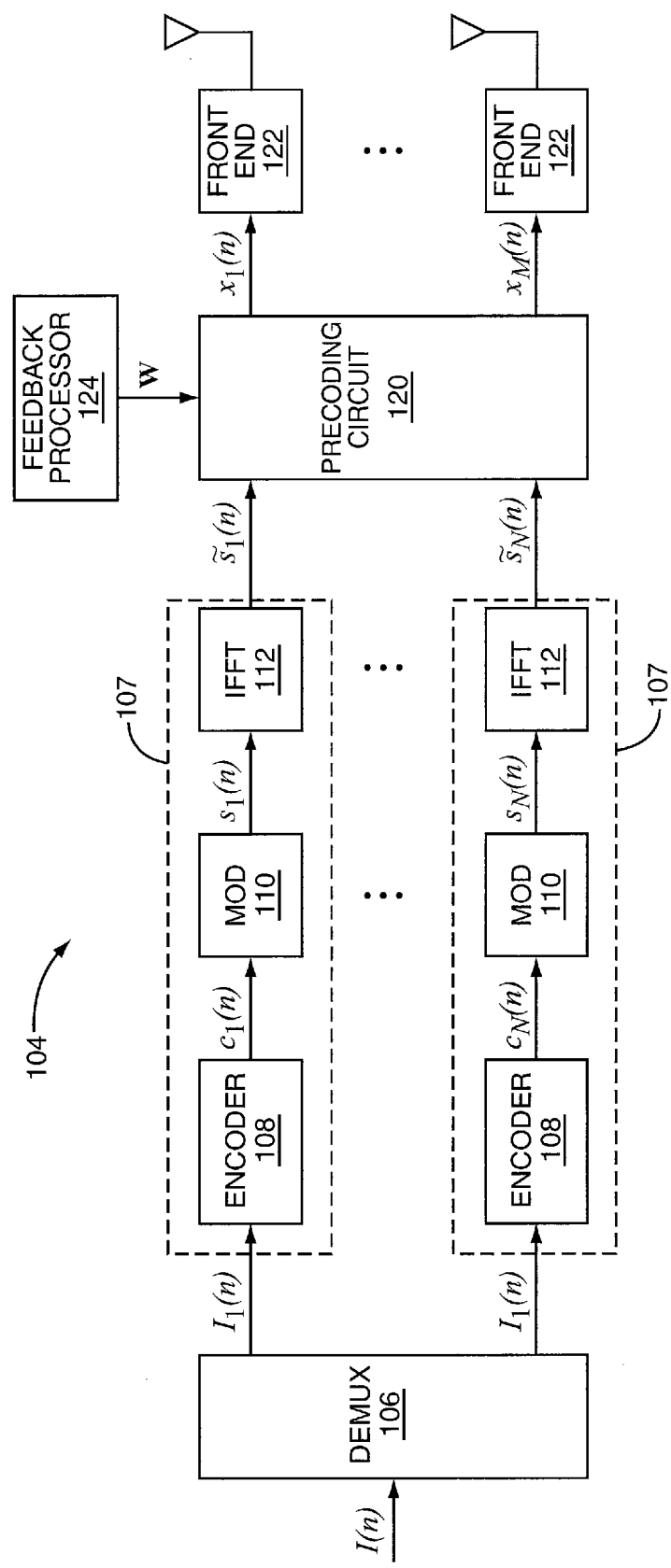
FIG. 7 illustrates a transmitter for a MIMO communication system using clustered EBF (CEBF).

The EBF approach requires that M×N complex coefficients be fed back from the receiver 200 to the transmitter 100 to compute the prefilter matrix. FIG. 7 illustrates a transmit signal processing circuit 104 for a transmitter 100 using a technique referred to herein as Clustered Eigen Beamforming (CEBF). This technique allows a reduction in the amount of channel feedback required while achieving performance levels that are very close to that obtained using the EBF approach with a clustered geometry. In this approach, the transmit antennas 150 are grouped into N antenna clusters 152, where N equals the number of receive antennas 250 at the receiver 200. In one embodiment, there are M/N transmit antennas 150 in each antenna cluster 152. For example, consider a MIMO system with six transmit antennas 150 and two receive antennas 250. The six transmit antennas 150 may be divided into two antenna clusters 152 with three transmit antennas 150 each. The transmit antennas 150 in each antenna cluster 152 are closely spaced (e.g., 0.5λ) so that the transmit antennas 150 in the same antenna cluster 152 are highly correlated. The antenna clusters 152 are spaced far apart (e.g., 10λ) so that the transmit antennas 150 in different antenna clusters 152 may be considered independent.

Figure 8:
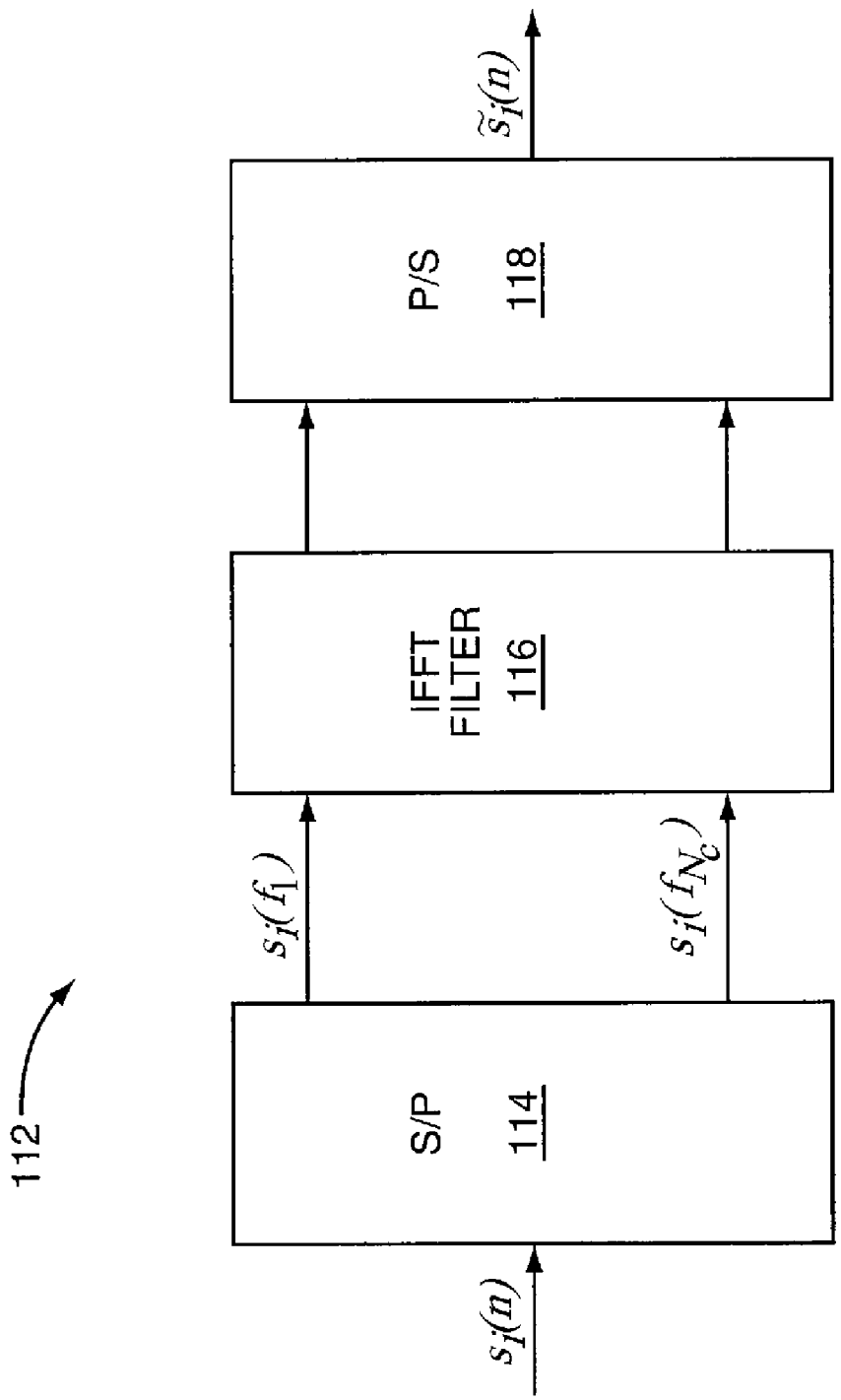
FIG. 8 illustrates an exemplary IFFT circuit for a MIMO transmitter.

The transmit signal processing circuit 104 for the CEBF approach comprises a demultiplexer 106, a channel coding circuit 107, a precoding circuit 120, a plurality of transmitter front end circuits 122, and a feedback processor 124. An information bitstream I(n) is divided by demultiplxer 1067 into N substreams $\{I_1(n), \ldots I_N(n)\}$, where equals the number of antenna clusters 152. Each substream $I_i(n)$ for i=1, . . . N is input to a corresponding channel coding circuit 107 including an encoder 108, a modulator 110, an Inverse Fast Fourier Transform (IFFT) circuit 112. Encoder 108 comprises an error correction encoder, such as a Turbo encoder or convolutional encoder. The modulator 110 may comprise, for example a QPSK or QAM modulator. The modulation symbol streams $\{s_1(n), \ldots s_N(n)\}$ output by the respective modulators 110 are input to an IFFT circuit 112 (FIG. 8).

The IFFT circuit 112 includes a serial-to-parallel (S/P) converter 114 to divide the stream of modulation symbols $s_i(n)$ from the modulator 110 into $N_c$ substreams, where $N_c$ equals the number of subcarriers, an IFFT filter 116 to apply an Inverse Fast Fourier transform as is known in the art, and a parallel-to-serial (P/S) converter 118 to generate a transmit signal $\tilde{s}_i(n)$.

The transmit signals $\{\tilde{s}_i(n), \ldots \tilde{s}_N(n)\}$ output from each channel coding circuit 107 is input to the precoding circuit 120. The precoding circuit 120 weights the transmit signals using antenna weights denoted by the weight vector W of size M/N×1 provided by the feedback processor 124. It should be noted that a common set of frequency independent antenna weights is used for each antenna cluster 152. The generation of the weighted transmit signals fed to each transmit antenna 150 from the transmit signals $\{\tilde{s}_i(n), \ldots \tilde{s}_N(n)\}$ is described below.

Figure 9:
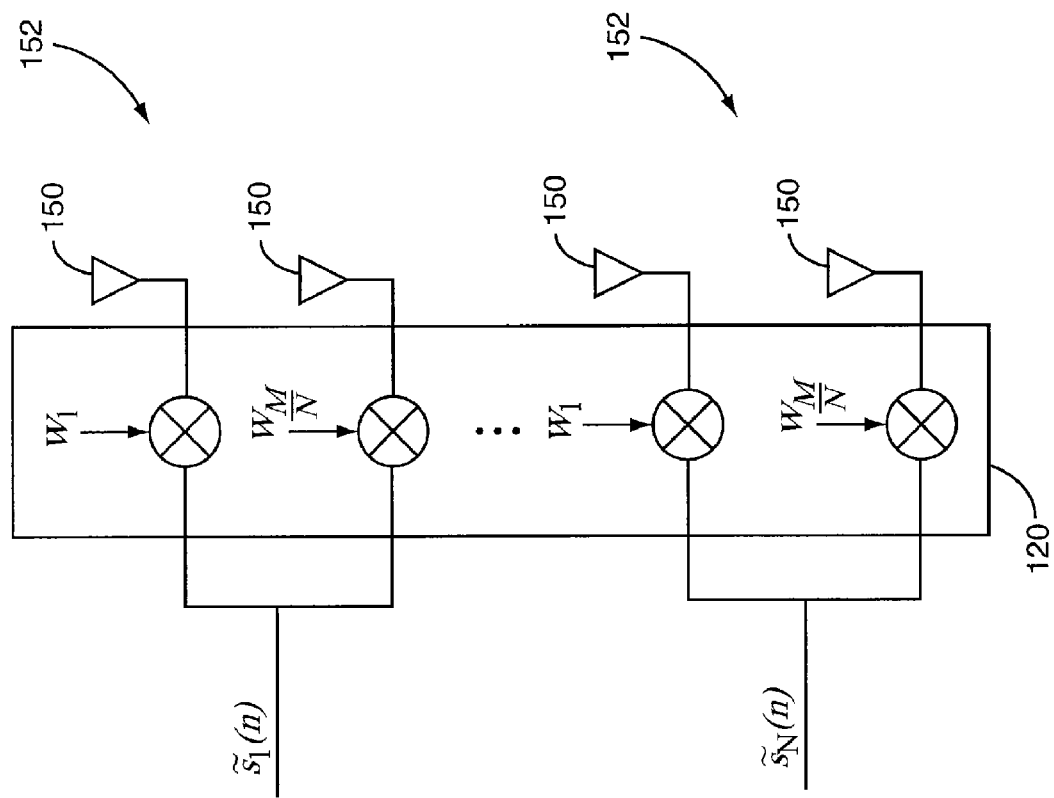
FIG. 9 illustrates an exemplary precoding circuit for a MIMO transmitter.

Referring to FIG. 9, the precoding circuit 120 takes $\{\tilde{s}_i(n), \ldots \tilde{s}_N(n)\}$ as its input and generates weighted transmit signals $\{x_1(n), \ldots x_M(n)\}$ at its output, where $x_k(n)$ represents the signal fed to the front end 122 of the kth transmit antenna 150.

The transmit antennas 150 are grouped into N antenna clusters 152, where each antenna cluster 152 comprises M/N transmit antennas 150. As shown in FIG. 9, $\tilde{s}_i(n)$ is fed to the transmit antennas 150 in the ith antenna cluster 152. For each transmit antenna 150 in the antenna cluster 152, the transmit signal $\tilde{s}_i(n)$ is weighted by a corresponding antenna weight $w_j$, where j denotes the jth transmit antenna 152 in an antenna cluster 152. Thus, the first transmit antenna 150 in the ith antenna cluster 152 transmits $\tilde{s}_i(n) \cdot w_1$, the second transmit antenna 152 in the it antenna cluster 152 transmits $\tilde{s}_i(n) \cdot w_2$, etc. More generally, the jth transmit antenna in the ith antenna cluster 152 transmits $\tilde{s}_i(n) \cdot w_j$.

In one exemplary embodiment, the same set of frequency independent antenna weights $$\{w_j\}_{j=1}^{\frac{M}{N}}$$

are used by each antenna cluster 152. The common set of antenna weights $$\{w_j\}_{j=1}^{\frac{M}{N}}$$

is represented by the weight vector $$w = \begin{bmatrix} w_1, & \ldots & w_{\frac{M}{N}} \end{bmatrix}^T.$$

The antenna weights may be computed as follows. Let $G_i(f)$ represent the N×M/N channel response matrix for the channel between the transmit antennas in the $i^{th}$ cluster 152 and the N receive antennas at the receiver. The weight vector W may be computed as the eigen vector corresponding to the largest eigen value of the transmit correlation matrix $$\overline{D} = \frac{1}{N_f} \frac{1}{N} \sum_{k=1}^{N_f} \sum_{i=1}^{N} G_i^T(f_k) G_i(f_k) \qquad \text{Eq. (3)}$$

The antenna weights may be computed by the receiver 200 and fed back to the transmitter 100 by the receiver 200 or, alternatively, computed by the feedback processor 124 based on feedback of antenna correlations from the receiver 200 as hereinafter described.

It may be noted that the transmit correlation matrix $\overline{D}$ is approximately equal to the expected value of the channel correlation matrix $E\{G_i^T(f)G_i(f)\}$ for each antenna cluster 152. It has been observed that with the clustered geometry, the correlations between transmit antennas 150 in an antenna cluster 152 will be the same for each antenna cluster 152 assuming that the antennas 150 in each antenna cluster 152 have the same relative spacing. Consequently, the expected value of the channel correlation matrix $E\{G_i^T(f)G_i(f)\}$ for the antennas 150 in all antenna clusters 152 are the same.

Figure 10:
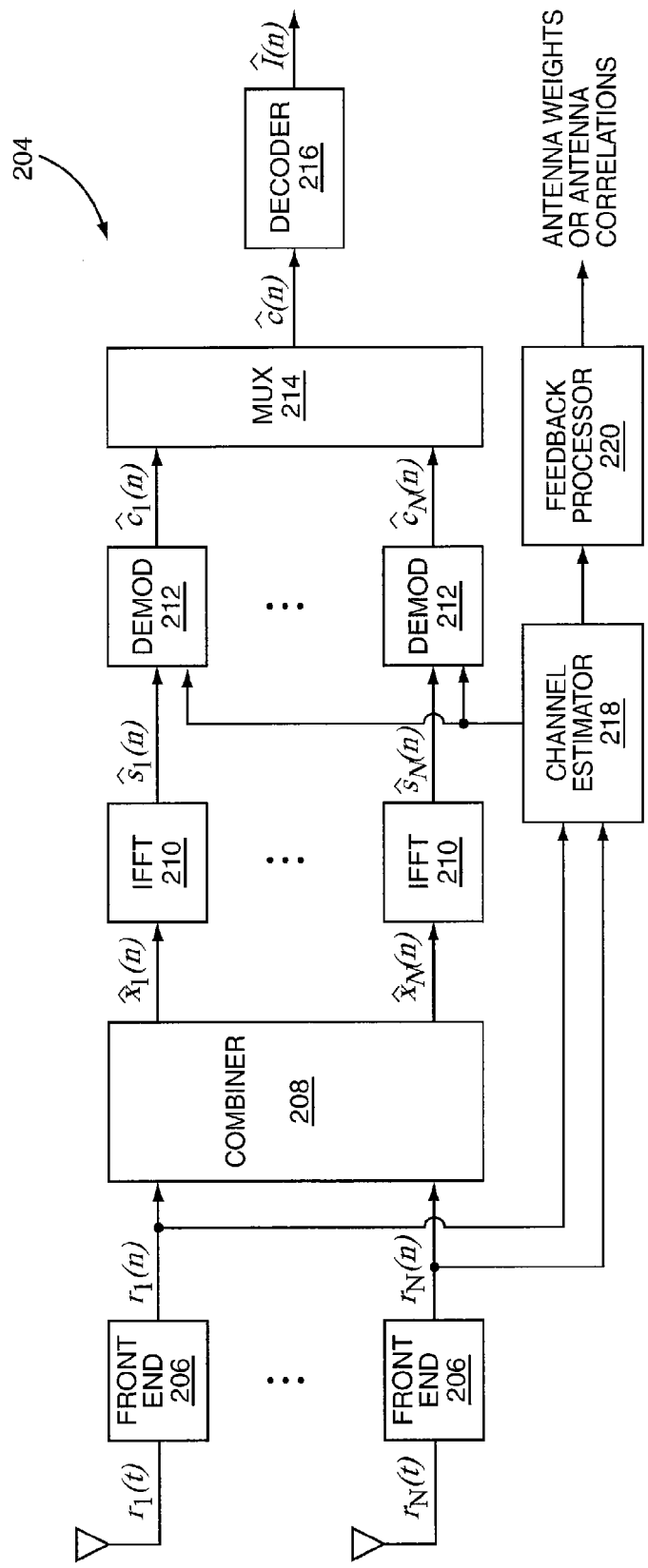
FIG. 10 illustrates a receiver for a MIMO communication system.

FIG. 10 illustrates the receive signal processing circuit 204 for a MIMO receiver 200 using the CEBF approach. The receiver comprises N receive antennas 250. As previously noted, the number of receive antennas 250 equals the number of antenna clusters 152 at the transmitter 100. A receiver front end circuit 206 downconverts the received signals $\{r_1(t), \ldots r_N(t)\}$ at each receive antenna 250 to baseband frequency and converts the baseband signals into digital form for processing by the receive signal processing circuit 204. The digitized received signals $\{r_1(n), \ldots r_N(n)\}$ are input to a combiner 208 that combines the received signals $\{r_1(n), \ldots r_N(n)\}$ and outputs estimates $\{\hat{x}_1(n), \ldots \hat{x}_N(n)\}$ of the transmitted signal $\{x_1(n), \ldots x_N(n)\}$. The estimates $\{\hat{x}_1(n), \ldots \hat{x}_N(n)\}$ are input to corresponding IFFT circuits 210 which apply a Fast Fourier transform and output estimates $\{\hat{s}_1(n), \ldots \hat{s}_N(n)\}$ of the modulation symbol streams $\{s_1(n), \ldots s_N(n)\}$. The symbol stream estimates $\{\hat{s}_1(n), \ldots \hat{s}_N(n)\}$ are demodulated by corresponding demodulators 212 using channel estimates provided by a channel estimator 218. The channel estimator 218 computes the channel estimates based on the received signal as known in the art. Demodulators 212 output estimates $\{\hat{c}_1(n), \ldots \hat{c}_N(n)\}$ of the coded bit streams. These estimates are input to a parallel to serial converter 214 and converted into a parallel bitstream, which is an estimate $\hat{c}(n)$ of the coded bitstream c(n) input at the transmitter 100. A decoder 216 decodes the estimate $\hat{c}(n)$ to produce an estimate $\hat{I}(n)$ of the original information signal I(n).

The channel estimates computed by the channel estimator 218 are also input to a feedback processor 220 to generate channel feedback for use by the transmitter 100. The channel feedback processor 220 may compute antenna weights as described above, and transmit the antenna weights to the transmitter 100. This approach requires the receiver 200 to feed back M×N antenna weights. Instead of computing antenna weights, the feedback processor 220 may instead compute the transmit correlations that comprise the transmit correlation matrix $\overline{D}$. In this case, the feedback processor 124 at the transmitter 100 can compute the antenna weights from the transmit correlations.

Those skilled in the art may recognize that it is not necessary to feed back the entire transmit correlation matrix $\overline{D}$. As previously noted, the transmit correlations in the transmit correlation matrix $\overline{D}$ represent the correlations between the transmit antennas 150 in a given antenna cluster 152, which is the same for all antenna clusters 152. It has been observed that the transmit correlation matrix $\overline{D}$ is a Toeplitz Hermitian matrix. Therefore, the receiver 200 only needs to feed back the transmit correlations corresponding to a single row in the transmit correlation matrix $\overline{D}$. With a single row of the transmit correlations, the transmitter 100 can reconstruct the transmit correlation matrix $\overline{D}$ and compute the combining weights.

Figure 11:
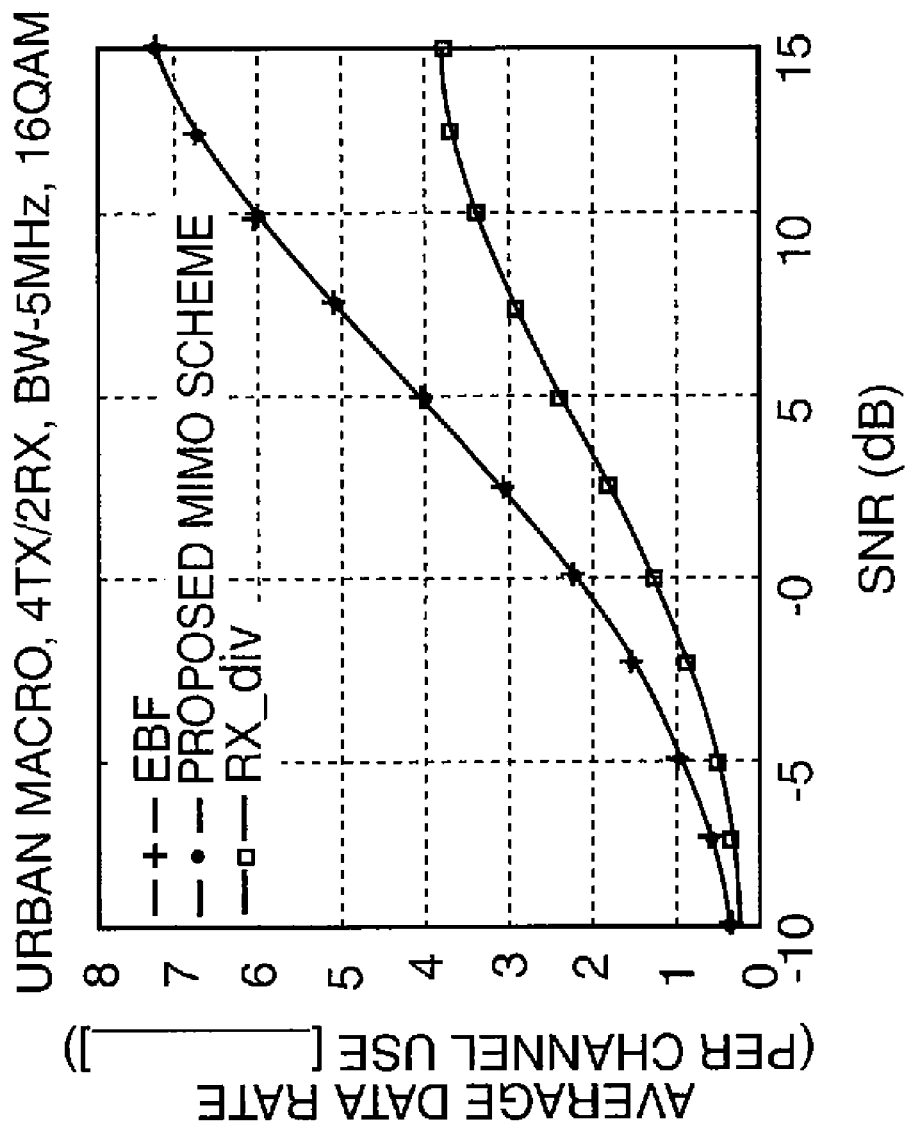
FIG. 11 is a graph illustrating the relative performance of MIMO transmitters using respectively CEBF and EBF with a clustered geometry.

FIG. 11 is a graph comparing the performance of the CEBF transmitter shown in FIG. 7 with a more conventional EBF transmitter using a clustered antenna geometry. As shown in FIG. 11, the CEBF approach achieves a performance level very close to the EBF approach using different antenna weights for each antenna cluster 152. Given that the CEBF approach significantly reduces the amount of channel feedback required, the CEBF approach provides an attractive alternative.

A transmitter 100 using the CEBF approach requires the computation of M/N antenna weights. In contrast, the more conventional EBF approach described above requires M×N antenna weights to be computed. Thus, the present invention reduces the number of antenna weights needed for operation by a factor of $N^2$ as compared to conventional practice.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A transmitter for transmitting a plurality of transmit signals, said transmitter comprising:
   a plurality of transmit antennas grouped into N antenna clusters, wherein each antenna cluster transmits a respective one of said transmit signals;
   a precoding circuit to weight the transmit signal transmitted from each transmit antenna in each antenna cluster using a common set of frequency independent antenna weights for all antenna clusters; and
   a feed back processor to receive antenna correlations from a receiver indicative of the correlations between transmit antennas within the same antenna cluster, and compute said common set of frequency independent antenna weights based on said antenna correlations.

2. The transmitter of claim 1 wherein said feedback processor computes said antenna weights by computing a transmit correlation matrix based on said antenna correlations, and selecting the eigen vector of said transmit correlation matrix having the largest eigen value as a common weight vector for weighting the transmit signal transmitted from each cluster.

3. The transmitter of claim 1 further comprising a channel feedback processor to receive said antenna weights from said receiver.

4. The transmitter of claim 1 wherein each antenna cluster has an equal number of transmit antennas.

5. The transmitter of claim 4 wherein the relative spacing of said transmit antennas in each antenna cluster is the same.

6. The transmitter of claim 5 wherein corresponding transmit antennas in different antenna clusters have the same antenna weights.

7. The transmitter of claim 1 wherein N equals the number of receive antennas at the receiver.

8. The transmitter of claim 1 further comprising:
   a multiplexer for dividing an information signal to be transmitted into N>1 substreams; and
   a channel coding circuit to encode and modulate each substream to create said transmit signals.

9. A method of transmitting a plurality of transmit signals comprising:
   grouping a plurality of transmit antennas into N antenna clusters, wherein each antenna cluster transmits a respective one of said transmit signals;
   weighting the transmit signal transmitted from each transmit antenna in each antenna cluster using a common set of frequency independent antenna weights for all antenna clusters;
   receiving antenna correlations from a receiver indicative of the correlations between transmit antennas within the same antenna cluster; and
   computing said common set of frequency independent antenna weights based on said antenna correlations.

10. The method of claim 9 wherein computing said antenna weights based on said antenna correlations comprises:
   computing a transmit correlation matrix based on said antenna correlations; and
   selecting the eigen vector of said transmit correlation matrix having the largest eigen value as a common weight vector for weighting the transmit signal transmitted from each cluster.

11. The method of claim 9 further comprising receiving said antenna weights from said receiver.

12. The method of claim 9 further comprising assigning the same number of transmit antennas to each antenna cluster.

13. The method of claim 12 further comprising spacing of said transmit antennas in each antenna cluster is the same.

14. The method of claim 13 further comprising assigning the same antenna weights to corresponding transmit antennas in different antenna clusters.

15. The method of claim 9 wherein N equals the number of receive antennas at the receiver.

16. The method of claim 9 further comprising:
   dividing an information signal into a plurality of substreams; and
   channel coding each substream to create said transmit signals.

17. A method of providing channel feedback in a multiple-input, multiple output communication system comprising a transmitter having a plurality of transmit antennas divided into two or more antenna clusters and a multiple antenna receiver, said method comprising: computing a single set of feedback information that is separately applicable to two or more antenna clusters; and providing the feedback information to the transmitter, wherein the feedback information comprises a set of antenna correlations indicating correlations between antennas within the same antenna cluster for calculating a common set of frequency independent antenna weights for the two or more antenna clusters.

18. The method of claim 17 wherein the feedback information comprises a common set of frequency independent antenna weights for said transmit antennas for use with each antenna cluster.

19. A mobile terminal for a multiple input, multiple output communication system, said mobile terminal comprising: a plurality of receive antennas to receive two or more transmit signals transmitted from different antenna clusters at a transmitter; and a receive signal processor configured to: compute a single set of feedback information that is separately applicable to two or more antenna clusters; and provide the feedback to the transmitter, wherein the feedback information comprises a set of antenna correlations indicating correlations between antennas within the same antenna cluster for calculating a common set of frequency independent antenna weights for the two or more antenna clusters.

20. The mobile terminal of claim 19 wherein the feedback information comprises a common set of frequency independent antenna weights for the transmit antennas in each antenna cluster.

* * * * *